United States Patent [19]

Asano et al.

[11] Patent Number: 5,186,069
[45] Date of Patent: Feb. 16, 1993

[54] CONTROL DEVICE FOR AUTOMATIC TRANSMISSION

[75] Inventors: Yasushi Asano; Yoshimasa Kataumi, both of Kosai, Japan

[73] Assignee: Fujikiko Kabushiki Kaisha, Shizuoka, Japan

[21] Appl. No.: 706,871

[22] Filed: May 29, 1991

[30] Foreign Application Priority Data

May 31, 1990 [JP] Japan .................. 2-57634

[51] Int. Cl.$^5$ .................. F16H 61/00; B60K 41/26
[52] U.S. Cl. .................. 74/477; 192/4 A
[58] Field of Search .................. 74/475, 477; 192/4 A

[56] References Cited

U.S. PATENT DOCUMENTS

| | | | |
|---|---|---|---|
| 1,466,453 | 8/1923 | Manville | 74/477 |
| 1,727,646 | 9/1929 | Hunt et al. | 74/477 |
| 3,942,614 | 3/1976 | Thompson | 192/4 A |
| 4,909,096 | 3/1990 | Kobayashi | 142/4 A X |
| 5,016,738 | 5/1991 | Shirahama et al. | 192/4 A |
| 5,025,901 | 6/1991 | Kito et al. | 192/4 A |

FOREIGN PATENT DOCUMENTS 0307846 3/1989 European Pat. Off. .
0347150 12/1989 European Pat. Off. .
0347861 12/1989 European Pat. Off. .

Primary Examiner—Leslie A. Braun
Assistant Examiner—David W. Laub
Attorney, Agent, or Firm—Hopkins & Thomas

[57] ABSTRACT

A control device for an automatic transmission is disclosed. The control device is provided with a base member mounted on a vehicle body. A shift lever is pivotably supported by the base member. The shift lever has a positioning pin movable in the axial direction of the shift lever. A guide member for guiding the shift lever is mounted on the base member, the guide member has a parking position part and a moving position part for engaging the positioning pin. The lock bushing for blocking disengagement of the positioning pin from the parking position part is mounted on the guide member and is supported by the guide member in a pivotable manner on a vertical pivoting locus surface. A lock solenoid for pivoting the lock bushing when releasing the shift-lock is mounted on the guide member. A lock releasing lever for manually pivoting the lock bushing to a shift-lock releasing position is mounted on the shift lever in a manner allowing movement parallel to the vertical pivoting locus surface.

6 Claims, 2 Drawing Sheets

CONTROL DEVICE FOR AUTOMATIC TRANSMISSION

BACKGROUND OF THE INVENTION

1. Field of the Invention

The present invention relates to a control device for an automatic transmission and more particularly to a control device for an automobile transmission suitable for a vehicle such as an automobile.

2. Description of the Prior Art

Conventionally, this kind of control device for an automatic transmission is provided with a shift-locking device which locks a shift lever for safety when the shift lever is positioned in a parking position and a brake pedal is not depressed.

The shift lever comprises a control lever pivotally mounted on a base bracket, and a compression rod contained by the control lever in a slidable manner in the axial direction and mounted with a positioning pin in the direction perpendicular to the above axis. The control lever is provided with a guide slot at the peripheral portion for guiding the movement of the positioning pin.

The shift-lock device comprises a lock bushing fitted on the control lever in a freely pivotable and axially immovable manner, and a lock solenoid for pivoting the lock bushing to a lock release position, mounted on the control lever through a mounting bracket.

According to this configuration, when the shift lever is positioned in the parking position, the descent of the positioning pin is blocked by the lock bushing, so that the shift lever is shift-locked. In this shift-locking condition, when the break pedal is pressed, the lock solenoid acts to pivot the rotary bushing to the shift-lock releasing position to release the shift-lock.

In addition, when releasing the shift-lock, if an electric system does not work, a lock releasing lever can be operated manually to pivot the lock bushing to a shift-lock releasing position through some intermediates.

However, in a conventional control device for an automatic transmission, the guide slot of the control lever is usually formed by a punch press operation. As a result of the punching operation, the control lever is deformed into elliptical cross-section near the slot. The lock bushing is fitted on the peripheral surface of this elliptic control lever. Therefore, to pivot the lock bushing smoothly, the inside diameter of the lock bushing must be large. As a result, a large wobble develops in the lock bushing, so that the lock bushing and positioning pin together produce a noise and the operation does not proceed smoothly.

In addition, because the lock solenoid is mounted on the control lever as a movable member, the wire must be made of a material resistant to repetitive bending and be long enough to prevent breakage. Therefore, the wire material becomes expensive and the length of the wire increases to accommodate the number of clips required for fastening the wire, thus raising the production costs. In addition, because the lock solenoid moves together with the shift lever, the lock solenoid requires enough space to move, and hence, the whole device must be large.

Further, because the action of the lock releasing lever is transmitted to the lock bushing through intermediates and the lock releasing layer cannot directly pivot the lock bushing, the number of parts increases, therefore increasing the production costs and complicating the adjustment of the parts.

SUMMARY OF THE INVENTION

An object of this invention is to provide a control device for an automatic transmission which can be prevented from producing a noise during operation and eliminates unsatisfactory work.

Another object of this invention is to provide a control device for an automatic transmission which is compact and low priced.

These and other objects can be achieved according to this invention by providing a control device for an automatic transmission comprising: a base member mounted on a vehicle body; a shift lever pivotably supported by the base member and comprising a positioning member movable in the axial direction of the shift lever; a guide member for guiding the shift lever, having a parking position part and a moving position part for engaging the positioning member; a lock bushing for blocking disengagement of the positioning member from the parking position part, mounted on a fixed member other than the shift lever and supported by the fixed member in a manner pivotable on a vertical pivoting locus surface; a lock solenoid for pivoting the part on the base member; a lock releasing lever for manually pivoting the lock bushing to a shift-lock releasing position, mounted on the shift lever in a manner allowing movement parallel to the vertical pivoting locus surface.

DETAILED DESCRIPTION OF THE PREFERRED EMBODIMENTS

Figure 1:
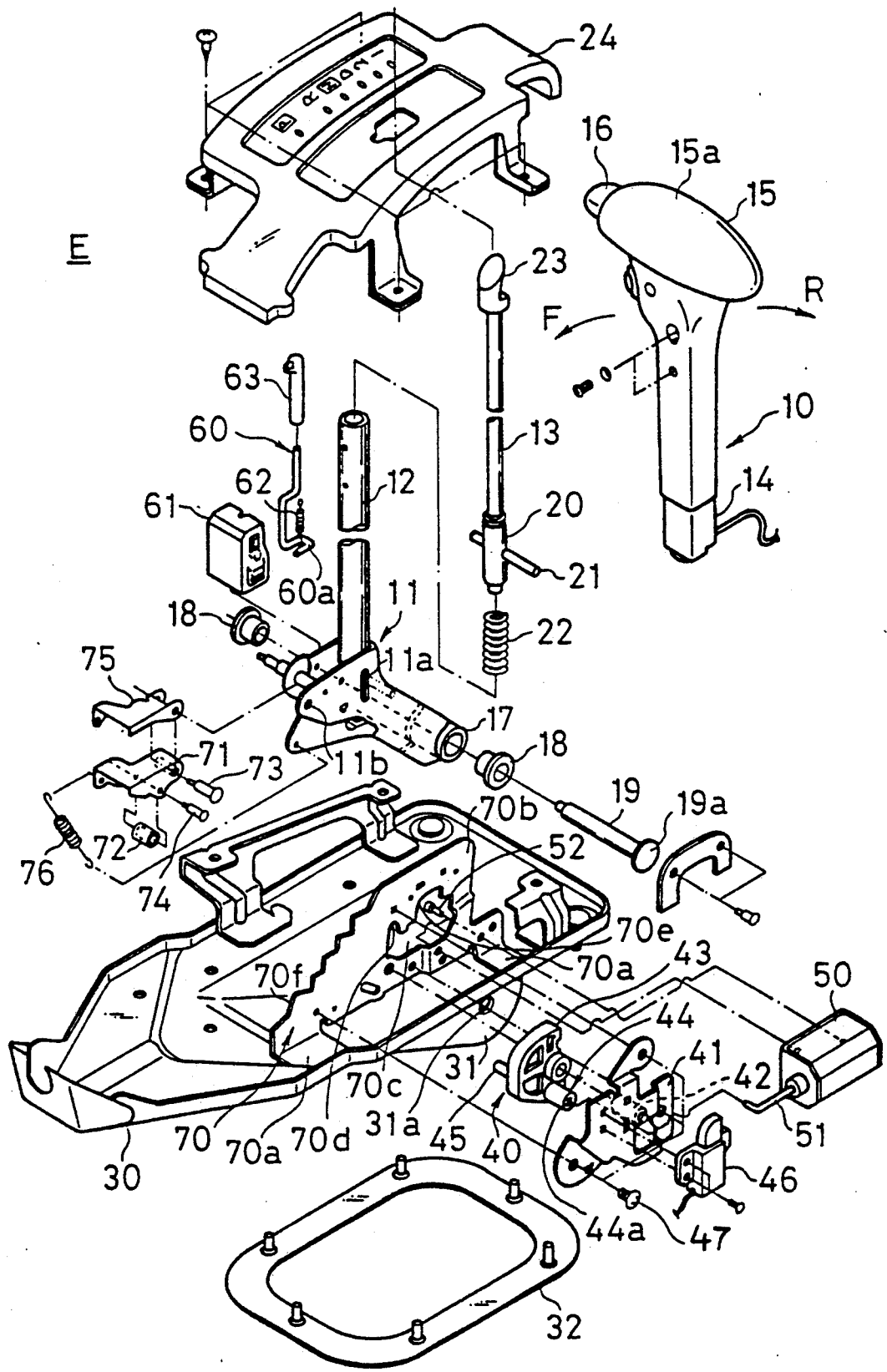
FIG. 1 shows an exploded perspective view of a control device for an automatic transmission according to this invention.
Figure 2:
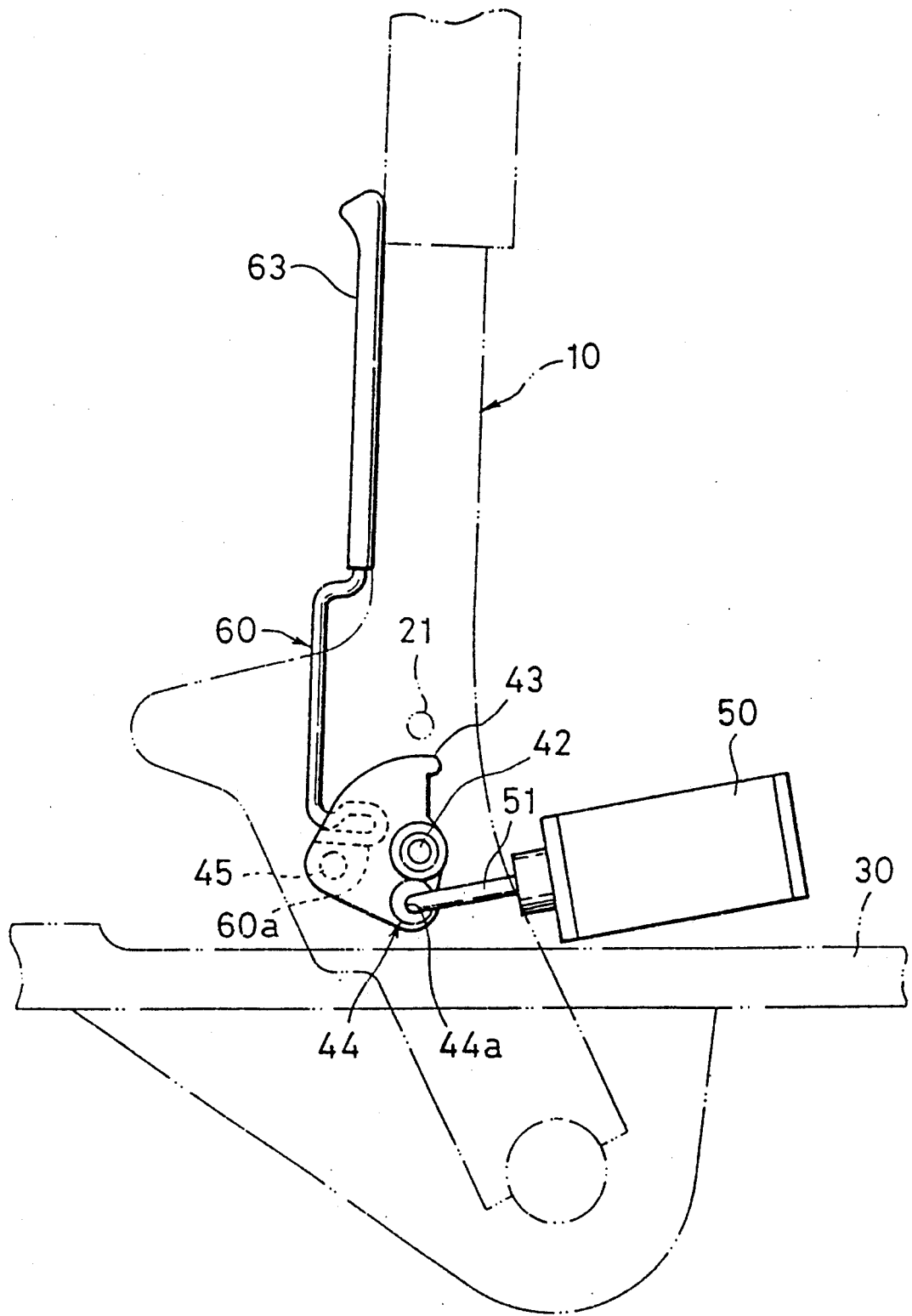
FIG. 2 shows a side view of a lock releasing lever device shown in FIG. 1.

Referring to FIGS. 1 and 2, a control device for an automatic transmission E comprises a shift lever 10 pivotably supported by a base bracket 30, a lock bushing 40 for shift-locking the shift lever 10 in the parking position, a lock solenoid 50 for pivoting the lock bushing 40 to a shift-lock releasing position according to the foot braking operation, and a lock releasing lever 60 for manually pivoting the lock bushing 40 to a lock releasing position and mounted on the shift lever 10 in a manner allowing movement in the axial direction.

The shift lever 10 is provided with a control lever 12 formed as pipe structure and connected with a bracket 11 at the lower portion thereof. The bracket 11 is U-shaped in cross-section and pivotably supported by the base bracket 30 secured to a vehicle body. A compression rod 13 is positioned inside the control lever 12 in a manner allowing movement in the axial direction and a knob 15 is mounted on the peripheral surface of the control lever 12 through an outer tube 14. A knob button 16 is slidably inserted into the head portion 15a of the knob 15 in the direction perpendicular to the axis of the control lever 12 and can be pressed by one finger.

The base bracket 30 is provided with a control lever mounting portion 31 for pivotably supporting the control lever 12. The bracket 11 of the control lever 12 is welded to a pipe 17 positioned in the direction perpendicular to the axis of the control lever 12. A pair of bushings 18 made of synthetic resin is pressed into the pipe 17, one from each side. The pipe 17 is installed in the control lever mounting portion 31. A pivot shaft 19 with a head 19a is inserted into an opening 31a on one side of the control lever mounting portion 31, into the pipe 17, and into the other opening 31a on the other side of the control lever mounting portion 31. The tip of the pivot shaft 19 is caulked. Consequently, the shift lever 10 can pivot on the pivot shaft 19 in the shift direction, i.e. in the longitudinal direction of the vehicle (in the front F and the rear R direction in FIG. 1).

The compression rod 13 is provided with a positioning pin mounting part 20 secured to the lower portion thereof, the positioning pin mounting part 20 is inserted into the control lever 12. A positioning pin 21 pierces the positioning pin mounting part 20 in the direction perpendicular to the axis of the compression rod 13 and is secured to the positioning pin mounting part 20. The bracket 11 of the control lever 12 is provided with a pair of guide slots 11a extending in the axial direction. The guide slots 11a are positioned one at each side of the positioning pin mounting part 20. The positioning pin 21 is extended through the pair of guide slots 11a in the direction perpendicular to the axis of the compression rod 13, whereby the positioning pin 21 can move along the pair of guide slots 11a in the axis direction of the control lever 12. The compression rod 13 is pressed in the upper direction by a compression spring 22 through the positioning pin mounting part 20 at all time.

The knob button 10 is outwardly pressed by a compression spring (not shown in the figure) accommodated in the head portion 15a of the knob 15, so that the tip of the knob button 16 projects out of the head portion 15a of the knob 15. The knob button 16 is provided with an indentation (not shown in the figure) at the other end portion of the knob button 16. A engaging member 23 is mounted on the upper end of the compression rod 13. The engaging member 23 engages the indentation of the knob button 16, so that when the knob button 16 is pressed, the compression rod 13 moves in the axial direction against the spring force of the compression spring 22 through the engaging member 23.

A positioning plate 70 for engaging the positioning pin 21 to keep the shift lever 10 in a parking position or a moving position is mounted on the base bracket 30. The positioning plate 70 is substantially L-shaped in cross-section and consists of a horizontal part 70a and a vertical part 70b. The horizontal part 70a is secured to the base bracket 30 and the vertical part 70b is provided with an opening 70c in the relatively rear portion thereof. A parking position recess 70d and a plurality of moving position recesses 70e are formed along the shifting direction at the opening 70c.

The vertical part 70b is also provided with a plurality of check recesses 70f in the direction from the front to rear corresponding to the parking position recess 70d and the moving position recess 70e. The recesses 70f are formed on a circular arc surface, of which the central point corresponds to the axis of the pivot shaft 19 formed on the peripheral surface at the front F side of the vertical part 70b of the positioning plate 70. A check roller 72 of the check arm 71 selectively contacts the check recesses 70f.

The check arm 71 is made of synthetic resin and pivotably supported at the base thereof by a free end of the bracket 11 of the control lever 12 through a mounting pin 73 inserted into a hole 11b of the free end. The check roller 72 is made of synthetic resin and is rotatably supported by the check arm 71 through a mounting pin 74.

The check arm 71 is provided with a reinforcing cover 75 made of metal plate for reinforcement thereof. One end of a tension spring 76 engages the reinforcing cover 75 and the other end engages the bracket 11. The tension spring 76 presses the check roller 72 into the check recessed 70f through the check arm 71.

The lock bushing 40 is made of synthetic resin and is pivotably supported by a member other than the shift lever 10, for example a switch bracket 41 secured to the positioning plate 70 by screw 47, in a manner pivotable on a pivot shaft 42 provided for the switch bracket 41 and positioned in the direction perpendicular to the axis of the control lever 12. The lock bushing 40 is provided with a lock portion 43 positioned directly under the positioning pin 21 engaging the parking position recess 70d and blocking the descent of the positioning pin 21. The lock bushing 40 is provided with a cylindrical portion 44 having a inserting hole 44a engaged by a plunger 51 of the lock solenoid 50, and is provided with a lock releasing pin 45 for contacting the lower end of the lock releasing lever 60.

The lock solenoid 50 is positioned in a portion on the base bracket 30. For example, the lock solenoid 50 is mounted on the positioning plate 70 through a mounting screw 52 and is connected to a power source through a wire and is activated when the foot brake is pressed. The plunger 51 is slidably held by the lock solenoid 50 and is always pressed toward the tip thereof by a compression rod not shown in the figure.

The lock releasing lever 60 is held by a bracket 61, which is mounted on the lower portion of the control lever 12, in a manner slidable in the axial direction of the control lever 12 and is upwardly pressed by a tension spring 62. A hook portion 60a formed at the lower end of the lock releasing lever 60 is positioned directly over the lock releasing pin 45 when the shift lever 10 is shifted to the parking position. A lock releasing knob 63 is fitted on the upper end of the lock releasing lever 60. The pivoting locus surface of the locus surface of the lock bushing 40.

In addition, in the figure, the reference numeral 24 designates a indicator mounted on the base bracket 30 for indicating the shift position of the shift lever 10, the reference numeral 32 designates a dust cover mounted on the back of the base bracket 30 for preventing the intrusion of dust from outside, and the reference numeral 46 designates a shift-lock switch mounted on the switch bracket 41 for detecting the shift-lock.

In the control device for an automatic transmission with this configuration, when the shift lever 10 is positioned in the parking position, the positioning pin 21 engages the parking position recess 70d and the lock portion 43 of the lock bushing 40 is positioned directly under the positioning pin 21, whereby the descent of the positioning pin 21 is blocked to shift-lock the shift lever 10. In addition, the check roller 72 of the check arm 70 is pressed into the check recess 70f corresponding to the parking position of the position plate 70 by the spring force of the tension spring 76.

When shifting the shift lever 10 from this shift-lock condition to the moving position by releasing the shift-lock, first the foot brake is pressed, then, the lock solenoid 50 is energized to withdraw the plunger 51 against the spring force of the tension spring, whereby the lock bushing 40 pivots counterclockwise to move the lock portion 43 to the outside of the locus of motion of the positioning pin 21.

Next, when the knob button 16 is pressed, the positioning pin 21 is downwardly pressed through the engaging member 23 and the compression rod 13 to disengage from the parking position recess 70d, following which the shift lever 10 is pulled to the rear R side. Then, when the positioning pin 21 reaches the moving position, the pressure on the knob button 16 is released and, as a result, the positioning pin 21 is upwardly moved by the spring force of the compression spring 22 to engage the moving position recess 70e. In this way, the shift lever 10 can be shifted to the moving position. Next, when the foot brake is released, the energization of the lock solenoid 50 is cancelled, to project the plunger 51 by the restoring force of the compression spring, so that the lock bushing 40 pivots clockwise to position the lock portion 43 directly under the parking position recess 70d. At this time, the check roller 72 of the check arm 71 engages the check recess 70f corresponding to the moving position.

When shifting the shift lever 10 form this condition to the parking position again, the knob button 16 is pressed to disengage the positioning pin 21 from the moving position recess 70e, then the shift lever 10 is shifted to the front F side. Next, the lock portion 43 of the lock bushing 40 is pressed by the positioning pin 21 to move from directly under the parking position recess 70d. Then, when the shift lever 10 reaches the parking position, the pressure to the knob button 16 is released and, as a result, the positioning pin 21 is upwardly moved by the spring force of the compression spring 22 to engage the parking position recess 70d. At the same time, the engagement between the positioning pin 21 and the lock portion 43 of the lock bushing 40 is released, so that the lock bushing 40 is pivoted clockwise to position the lock portion 43 directly under the positioning pin 21, whereby the shift lever 10 is again shift-locked.

Now, in the case where the shift-lock of the shift lever 10 is to be released, if a problem should arise with the lock solenoid 50 because of power failure, the lock releasing knob 63 is downwardly depressed against the spring force of the tension spring 62. Then, the lock releasing lever 60 descends, the hook portion 60a contacts the lock releasing pin 45 of the lock bushing 40, and the lock bushing 40 pivots counterclockwise with further descent of the lock releasing lever 60. By this action, the lock portion 43 of the lock bushing 40 moves to the outside of the locus of the motion of the positioning pin 21 so that the shift lever 10 may be shifted to the moving position.

According to this embodiment, because the lock bushing 40 is mounted on the position plate 70 through the switch bracket 41 rather than the shift lever 10, the diameter of the pivot shaft 42 as pivot of the lock busing 40 may be small. As a result, the pivoting friction becomes small, and the lock bushing 40 is prevented from producing a noise and unsatisfactory operation because of the wobble of the lock bushing 40 when shift-locking is prevented. In addition, because the diameter of the pivot shaft 42 may be small, it is not necessary for the plunger 51 of the lock solenoid 50 to move to the limit of the working stroke to pivot the lock bushing 40 by a required amount. Therefore, high mounting accuracy of the lock solenoid 50 is not required, so that it is very easy to adjust the mounting position of the lock solenoid 50.

Further, the lock solenoid 50 is mounted on the base bracket 30 as a fixed member, for example the positioning plate 70, so that the wire may be as short as possible and an inexpensive material may be used for, the number of clips for fastening the wire may be small, and consequently the production costs may be reduced. In addition, because a working space for the lock solenoid 50 is not especially required, the whole device can be compact.

Moreover, the pivot locus surface of the lock bushing 40 is parallel with the moving locus surface of the lock releasing lever 60, so that the lock releasing lever 60 may directly pivot the lock bushing 40 without the use of an intermediate member. As a result, the number of the parts can be small to further reduce the production costs and to allow easy adjustment of the position of each part.

What is claimed is:

1. A control device for an automatic transmission, comprising:
    a base member mounted on a vehicle body;
    a shift lever pivotably supported by said base member and comprising a positioning member movable in the axial direction of said shift lever;
    a guide member for guiding said shift lever, having a parking position part and a moving position part for engaging said positioning member;
    a lock bushing for blocking disengagement of said positioning member from said parking position part, mounted on a fixed member other than said shift lever and supported by said fixed member in a manner pivotable on a pivoting locus surface;
    a lock solenoid mounted on a fixed part of said base member for pivoting said lock bushing from a shift-lock position in which said lock bushing blocks disengagement of said positioning member from said parking position part to a shift-lock releasing position in which said lock bushing does not block disengagement of said positioning member from said parking position part; and
    a lock releasing lever mounted on said shift lever in a manner movable through a moving locus surface for manually pivoting said lock bushing to the shift-lock releasing position, the pivoting locus surface of the lock bushing being parallel with the moving locus surface of the lock releasing lever.

2. The control device for an automatic transmission according to claim 1, wherein said guide member includes a plate member secured to said base member, a bracket secured to said plate member, and said lock bushing is pivotably supported by said bracket.

3. The control device for an automatic transmission according to claim 1, wherein said guide member includes a plate member, a bracket is secured to said plate member, and said lock solenoid is mounted on said bracket.

4. The control device for an automatic transmission according to claim 1, wherein said lock releasing lever mounted on said shift lever in an axially movable manner.

5. A control device for an automatic transmission, comprising:
    a base member mounted on a vehicle body;
    a shift lever pivotably supported by said base member and comprising a positioning member movable in the axial direction of said shift lever;

a guide member for guiding said shift lever, having a parking position part and a moving position part for engaging said positioning member;

a lock bushing for blocking disengagement of said positioning member from said parking position part, mounted on a fixed member other than said shift lever and supported by said fixed member in a manner pivotable on a pivoting locus surface perpendicular to the base member;

a lock solenoid mounted on a fixed part of said base member for pivoting said lock bushing from a shift-lock position in which said lock busing blocks disengagement of said positioning member from said parking position part to a shift-lock releasing position in which said lock bushing does not block disengagement of said positioning member from said parking position part from a shift-lock position to its shift-lock releasing position; and a lock releasing lever mounted on said shift lever for movement through a moving locus surface that is parallel to said pivoting locus surface for manually pivoting said lock bushing to its shift-lock releasing position, whereby the lock releasing lever can directly pivot the lock bushing.

6. A control device for an automatic transmission, comprising:

a base member mounted on a vehicle body;

a shift lever pivotably supported by said base member and comprising a positioning member movable in the axial direction of said shift lever;

a guide member for guiding said shift lever, having a parking position part and a moving position part for engaging said positioning member;

a lock bushing for blocking disengagement of said positioning member from said parking position part, mounted on a fixed member other than said shift lever and supported by said fixed member in a manner pivotable through a locus of movement;

lock solenoid mounted on a fixed part of said base member for pivoting said lock bushing from a shift-lock position in which said lock bushing blocks disengagement of said positioning member from said parking position part to a shift-lock releasing position in which said lock bushing does not block disengagement of said positioning member from said parking position part; and a lock releasing lever mounted on said shift lever in a manner movable through a locus of movement, the locus of movement of said lock bushing being in the same plane as the locus of movement of said lock releasing lever.

* * * * *